UNITED STATES PATENT OFFICE.

JOHANNES M. KESSLER, OF WEST ORANGE, NEW JERSEY, ASSIGNOR TO E. I. DU PONT DE NEMOURS & COMPANY, OF WILMINGTON, DELAWARE, A CORPORATION OF DELAWARE.

CELLULOSE-ACETATE COMPOSITION.

1,303,563.      Specification of Letters Patent.      Patented May 13, 1919.

No Drawing.      Application filed November 14, 1918. Serial No. 262,525.

*To all whom it may concern:*

Be it known that I, JOHANNES M. KESSLER, of West Orange, in the county of Essex, and in the State of New Jersey, have invented a certain new and useful Improvement in Cellulose-Acetate Compositions, and do hereby declare that the following is a full, clear, and exact description thereof.

My invention relates particularly to compositions containing cellulose acetate and which contain acetaldol as a solvent, and it relates to compositions of many different kinds in which these constituents are present, as for example, coating compositions applied to aeroplane surfaces.

The object of my invention is to provide a composition containing cellulose acetate in which acetaldol is present as a solvent and in which the acetaldol acts as a softening agent for the product obtained. For example—the object of my invention is to provide a coating composition containing cellulose acetate and acetaldol by means of which coatings may be produced which will resist the action of the weather for an unusually long period of time.

While my invention is capable of being carried out in many different ways, for the purpose of illustration I shall describe only certain ways of carrying out the same hereinafter.

For example—a composition made in accordance with my invention may be made with the following constituents in the proportions given.

| | |
|---|---|
| Cellulose acetate | 6 to 8% by weight. |
| Acetaldol | 10 to 20% by weight. |
| Solvent mixture | 72 to 82% by weight. |

The solvent mixture may contain a variety of constituents, but by way of example it may be made as follows:

| | |
|---|---|
| Acetone | 40% by weight. |
| Ethyl acetate | 30% by weight. |
| Benzol | 20% by weight. |
| Denatured alcohol | 10% by weight. |
| | 100% | or,

| | |
|---|---|
| Methyl acetate | 60% by weight. |
| Ethyl formate | 10% by weight. |
| Ethyl methyl ketone | 10% by weight. |
| Benzol | 20% by weight. |
| | 100% |

In these compositions it will be noted that there is a volatile low boiling solvent such as acetone, ethyl acetate, methyl acetate or ethyl formate, and in addition a less volatile higher boiling active, latent and non-solvent, such as ethyl methyl ketone, benzol or denatured alcohol.

Compositions made in this way work very well under the brush and do not produce blushing even under a very high relative humidity, and coatings produced by the same remain practically perfect for an unusually long period, when subjected to the weather test, thus indicating that the acetaldol has an advantageous effect in softening the product.

While I have described my invention above in detail, I wish it to be understood that many changes may be made therein without departing from the spirit of the same.

I claim:

1. A composition containing cellulose acetate and acetaldol.

2. A composition containing cellulose acetate, acetaldol and a volatile solvent.

3. A composition containing cellulose acetate, acetaldol and a volatile solvent mixture comprising a volatile solvent and a higher boiling constituent.

4. A composition containing cellulose acetate, acetaldol and a volatile solvent mixture comprising acetone, ethyl acetate, benzol and denatured alcohol.

5. A composition containing 6 to 8% by weight of cellulose acetate and 10 to 20% by weight of acetaldol.

6. A composition containing 6 to 8% by weight of cellulose acetate, 10 to 20% by weight of acetaldol and a volatile solvent.

7. A composition containing 6 to 8% by weight of cellulose acetate, 10 to 20% by weight of acetaldol and a volatile solvent mixture comprising a volatile solvent and a higher boiling constituent.

8. A composition containing 6 to 8% by weight of cellulose acetate, 10 to 20% by weight of acetaldol and a volatile solvent mixture comprising acetone, ethyl acetate, benzol and denatured alcohol.

In testimony that I claim the foregoing I have hereunto set my hand.

JOHANNES M. KESSLER.

Witnesses:
THOMAS L. DELANEY,
WM. E. DAVIS.